M. J. OTTO.
CONTROLLER FOR REELS FOR FISHING LINES.
APPLICATION FILED SEPT. 4, 1917.
1,321,841.
Patented Nov. 18, 1919.
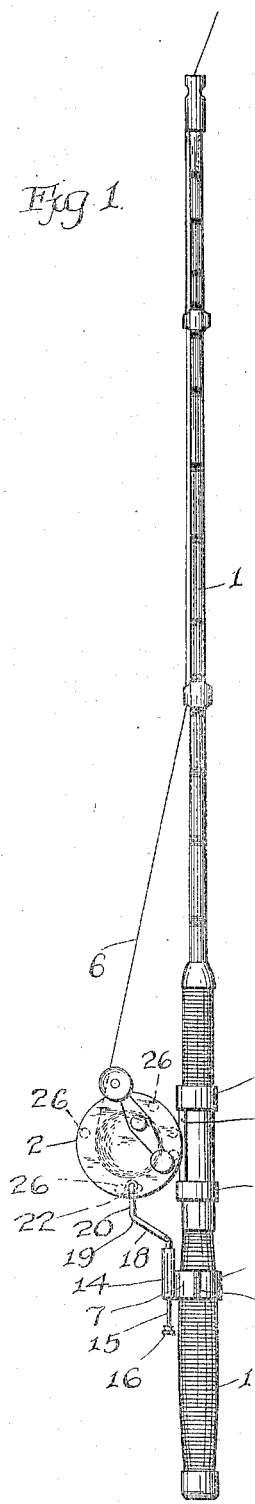
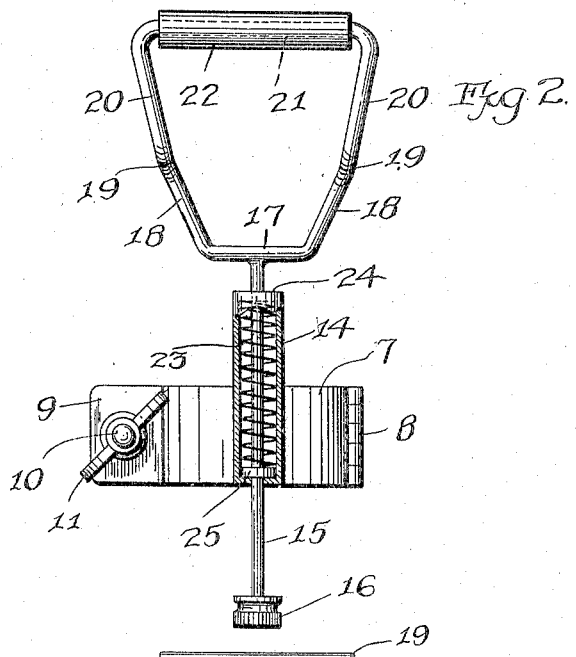
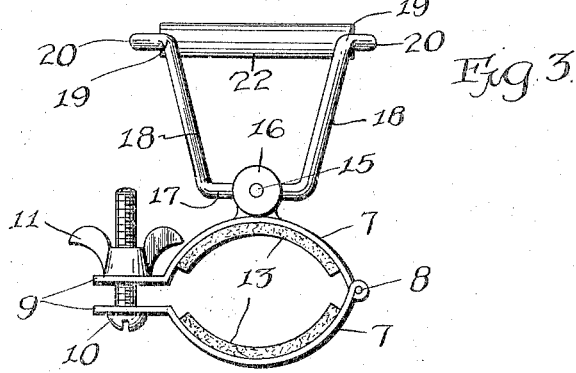
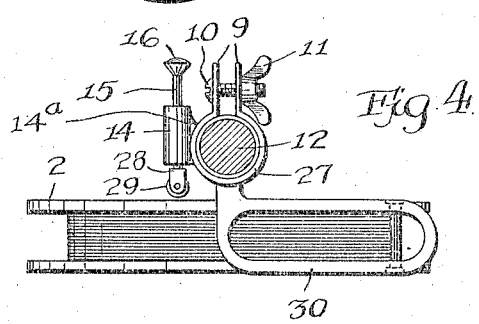
INVENTOR:
Maximilian J. Otto.
BY
Chas. M. Chapman
ATTORNEY.

UNITED STATES PATENT OFFICE.

MAXIMILIAN J. OTTO, OF NEW YORK, N. Y.

CONTROLLER FOR REELS FOR FISHING-LINES.

1,321,841.  Specification of Letters Patent.  Patented Nov. 18, 1919.

Application filed September 4, 1917. Serial No. 189,485.

*To all whom it may concern:*

Be it known that I, MAXIMILIAN J. OTTO, a citizen of the United States, residing in the borough of Manhattan, city, county, and State of New York, have invented a new and useful Improvement in Controllers for Reels for Fishing-Lines, of which the following is a description.

This invention relates to fishing rods and reels therefor, and, particularly, has reference to controllers for the reels whereby to impose stress or tension upon the line and control the paying off of the latter.

Among the objects of my invention may be noted the following: to provide means by which the line may be prevented from running too freely from the reel during use; to provide means for imposing upon the line or the reel a positive check so that the paying off of the line may be controlled; to provide a controller within reach of the fingers of the hand grasping the fishing rod, whereby to impose tension or a brake upon the reel or the line wound thereon; to provide a controller which is easily manipulated, simple in construction, effective in operation, and which may be readily attached to, and detached from, the rod in proper juxtaposition to the reel; to provide means which is adapted to impose a brake upon either the reel or directly upon the line by the movement of one finger or the thumb while the operator maintains firm hold of the rod; and to provide a brake mechanism in combination with a line-guiding means of such character as to enable the operator to control the paying off of the line while the line is properly guided and prevented from becoming entangled with the reel or the journals thereof, or any adjacent part or member of the rod.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is an elevation of a fishing rod equipped with reel and line and having one form of my controller applied thereto in proper relation to the reel;

Fig. 2 is a top plan view, partly in section, of the form of controller shown in Fig. 1;

Fig. 3 is a rear end view of Fig. 2; and

Fig. 4 is a top plan of a combined reel-controller and line-guide, the view showing the pole in section and the reel in plan, and a different form of controller.

Referring to the drawings, the numeral 1 indicates the rod, 2 the reel detachably secured to the rod in usual manner, as by attaching plate 3, fixed collar 4 and sliding collar 5; and 6 indicates the line, the bulk of which is wound upon the reel 2. In the form of my invention shown in Figs. 1, 2 and 3, the line-controller engages directly with the bulk of the line upon the reel, and, preferably, is detachably secured to the handle of the rod in rear of the reel in position such that the thumb or first finger of the hand which grasps the rod may manipulate the controller to apply the brake to the bulk of the line wound upon the reel and thus control the paying off of the line from the reel. Referring particularly to Figs. 1, 2 and 3, the controller consists of a clamp, the members 7 of which are hinged together at 8, and the opposite ends of which are bent at an angle and into parallelism, as at 9, through which a headed screw 10 is extended and upon which screw a winged nut 11 is turned, so as to impose pressure upon the parallel extensions 9 of the clamp to cause the latter to firmly grip the handle 12 of the rod and hold the controlling member in proper position thereon and relatively to the reel. If desired, frictional strips 13 may be applied to the inner surfaces of the clamping members 7. The top clamp member has formed thereon a cylindrical barrel 14, through which extends a rod 15, the rear end of which is provided with an enlargement or knob 16, and the front end of which has connected to it an angular frame consisting of a rear cross-bar 17, two upwardly and forwardly bent and divergent arms 18, which in turn are bent at 19 and extended into divergent, horizontal arms 20, terminating at their forward end in a front cross-bar 21, on which is journaled an anti-frictional roll or cylinder 22. Within the cylindrical barrel 14 an expansion spring 23 is housed, which surrounds the rod 15 and engages at one end the closed end 24 of the barrel, and, at its opposite end, a collar 25 fixed to the rod 15, limited in its movement by the opposite closed end of the barrel. Thus, the rod 15 and its controller are normally held in the retracted position shown in Figs. 1 and 2; and, when the thumb or finger is pressed upon the knob 16, the rod 15 is caused to force the controller with its anti-frictional roll 22 against the bulk of the line upon the reel, thus compressing the spring 23 within the barrel 14. As shown in Fig. 1, the anti-frictional roll of the controller is preferably set just below one of the tie-bars 26, which holds the disk ends of the reel together. By this means the controller is prevented from being carried upwardly or outwardly, under the drag of the line, when pressure is imposed thereon by pressing the knob 16 of the rod 15, to force the anti-frictional roll 22 into engagement with the line, it being understood that, as the line pays off from the reel, the tendency would be to carry the controller outwardly or in the angular direction of the run of the line from the reel, thus defeating the purpose of the controller and tending to bend the same. By disposing the anti-frictional roll of the controller directly below one of the bars 26, as shown in Fig. 1, the controller is held in a fixed position relatively to the reel and to the bulk of the line thereon, the controller is prevented from being diverted and bent, and considerable stress can be imposed upon the line by a light pressure with the thumb or finger upon the knob 16. Immediately the knob is released, the spring 23 will expand and force the rod and controller rearwardly, thus relieving the line on the reel from pressure and permitting it to run freely with the reel.

In the form of my invention shown in Fig. 4, the pressure and control are imposed directly upon one of the disks of the reel, similar parts in this figure being indicated by numerals corresponding to such parts in Fig. 1. This form of my invention is shown as comprising an integral, single, spring collar 27, which encircles the rod-handle 12, and has the parallel end members 9, and a screw with head 10, and winged nut 11 for clamping the collar upon the rod. The collar has the cylindrical barrel 14, carried, if desired, by a plate or member 14ª, through which barrel is extended the rod 15 having knob 16; and within which barrel 14 is a spring which operates the same as that shown in Fig. 2. In this form of my invention the forward end of the rod is provided with the bifurcated end 28, in which is journaled the anti-frictional roll 29, which may be made of any soft, friction-producing material. It is to be noted that, in this form of my invention, the controlling device is formed in one with the line-guide 30 which is identical with that made the subject of my application Serial No. 178,432, filed July 3, 1917. In this form of my invention I have been able to adapt the controller to the line-guide so as to enable the operator to impose pressure upon one of the disks or heads of the reel, instead of upon the bulk of the line wound upon the reel. It will be understood that, in this form of my invention, if the rod is grasped in the right hand, as usual, the control of the line and reel will be by the thumb or finger of the left hand pressing upon the nut 16 to force the anti-frictional roll 29 against the side of the reel and impose drag upon the latter, and thus control the paying off of the line.

From the foregoing description, it will be understood that, in both forms of my invention, the controlling idea of means is carried into effect, since, in the first instance, the paying off of the line is controlled by imposition of pressure directly upon the bulk of the line on the reel, and, in the other instance, directly upon the reel and indirectly upon the line. In each instance, the control is positive and direct and has been found to be exceedingly prompt and effective.

Having thus described my invention, what I claim and desire to secure by Letters Patent is:

1. A controller for fishing lines comprising a pressure-producing member having an anti-frictional device; means at an angle to the member for securing the latter to a rod; means for normally holding the device in an inoperative position; and means for putting the member in operative position to control the paying off of the line from the reel by pressure thereon in a direction parallel with the rod to which it is secured.

2. In combination with a fishing rod having a reel secured thereto, a controller for the line mounted entirely upon the rod comprising a reciprocatory member carrying an anti-frictional roll, and means for operating upon the member to move the roll longitudinally of the rod toward the reel to position to engage the line.

3. A controller for fishing lines comprising a supporting member, a rod yieldingly mounted on said member, means carried by said rod offset from the supporting means for coöperating with the line on the reel, and anti-frictional means carried by the offset means for directly engaging the line.

MAXIMILIAN J. OTTO.